Figure 1:
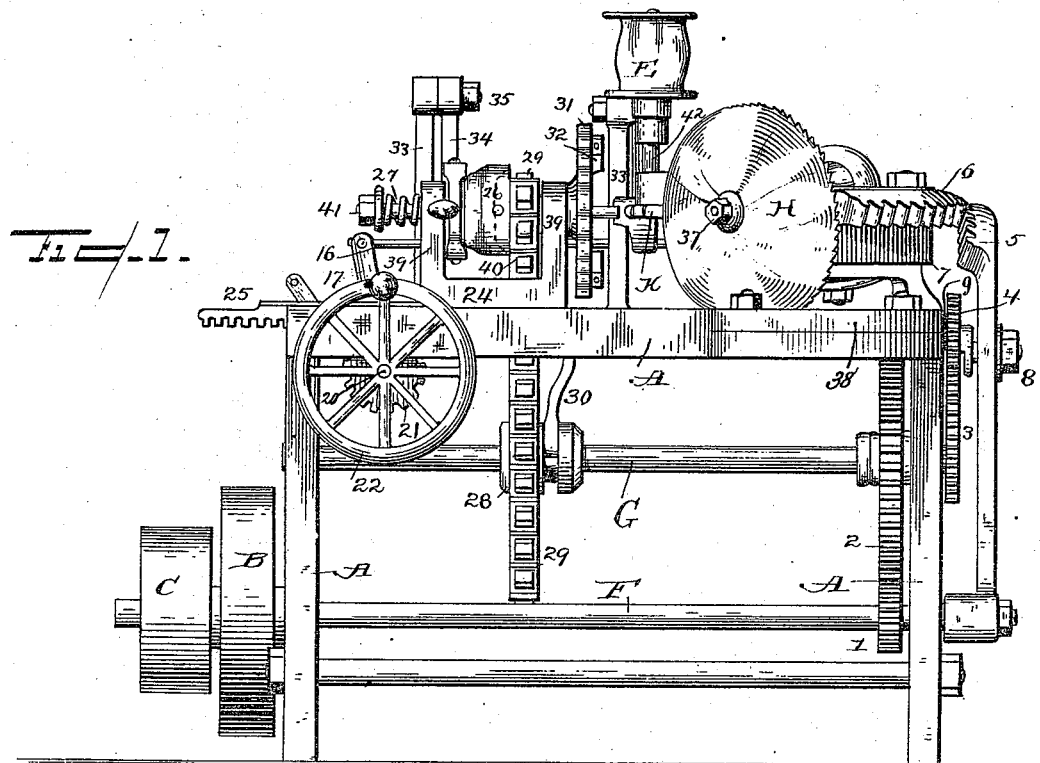
Figure 3:
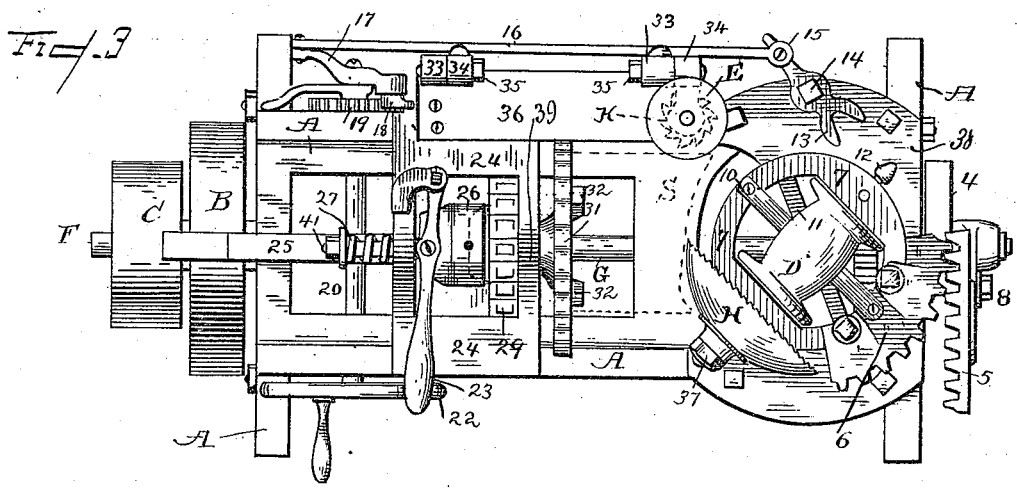
Figure 2:
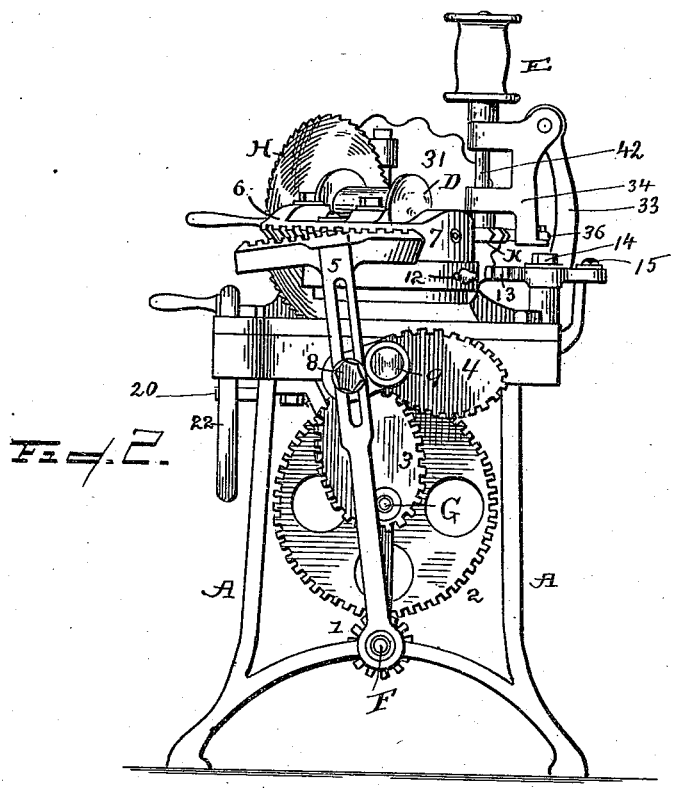
Figure 4:
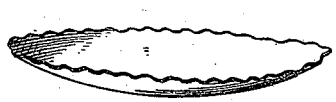

(No Model.) 2 Sheets—Sheet 1.

D. H. BRENNER.
MACHINE FOR CUTTING CONCAVO-CONVEX WOODEN DISHES.

No. 501,404. Patented July 11, 1893.

Witnesses
Ira P. Steward.
J. A. Rutherford

Inventor
David H. Brenner
By Edward Taggart
Attorney (No Model.) 2 Sheets—Sheet 2.

D. H. BRENNER.
MACHINE FOR CUTTING CONCAVO-CONVEX WOODEN DISHES.

No. 501,404. Patented July 11, 1893.

Witnesses
Ira R. Steward.
J. A. Rutherford.

Inventor
David H. Brenner.
By Edward Taggart
Attorney

UNITED STATES PATENT OFFICE.

DAVID H. BRENNER, OF GRAND RAPIDS, MICHIGAN.

MACHINE FOR CUTTING CONCAVO-CONVEX WOODEN DISHES.

SPECIFICATION forming part of Letters Patent No. 501,404, dated July 11, 1893.

Application filed April 15, 1890. Serial No. 348,022. (No model.)

*To all whom it may concern:*

Be it known that I, DAVID H. BRENNER, a citizen of the United States, residing at the city of Grand Rapids, in the county of Kent and State of Michigan, have invented certain new and useful Improvements in Machines for Cutting Concavo-Convex Wooden Dishes, of which the following is a specification.

This invention relates to machines for cutting concavo-convex wooden dishes from wooden blocks and has for its object to provide novel means whereby a segmental saw serves to sever a complete concavo-convex dish from a revolving block; to provide novel means for bringing the block in contact with the saw, and to otherwise improve and render practicable machines for manufacturing wooden dishes.

To accomplish these objects my invention consists in the features of construction and the combination or arrangement of devices hereinafter described and claimed, reference being made to the accompanying drawings, in which—

Figure (1) is a front elevation of a machine adapted to cut dishes in accordance with my invention. Fig. (2) is an end view of the same showing my preferred form of feeding device. Fig. (3) is a plan view showing the feeding device; and Fig. (4) shows the form of a dish cut from a block in accordance with my invention.

Similar letters and figures refer to similar parts throughout the several views.

The working mechanism is supported upon any suitable frame, the frame being shown by A. A. A band pulley C. is connected by a band with any suitable power and is rigid with the shaft F carrying a balance wheel B. Attached to the shaft F. is a pinion 1, which engages with a gear 2. on shaft G. On the shaft G. is an elliptic gear 3, engaging with elliptic gear 4, which gear 4 turns on stud or pin 9. A gear arm 5, turns on a pivot at its lower end, and is provided with a slot for the reception of the pin 8, which pin 8 is connected by a suitable connection to the gear wheel 4. The gear arm 5 has cogs engaging with the cogs 6 on the yoke 7. The revolution of the gear 4 gives a reciprocating movement to the upper end of arm 5, which conveys such motion to the yoke 7 and parts supported thereon. The yoke 7 is preferably circular in form and rests upon a suitable support 38, which support may be made integral with the frame A. or may be secured thereto by means of bolts H. is the segmental or concavo-convex saw attached to a saw arbor by a nut 37 or by any suitable means so that the arbor extends from the concave face of the saw.

D. is a band pulley on the saw arbor, which is revolved by a band connected to any suitable power. In the illustration of my invention shown in the drawings, I connect the pulley D. to a pulley from above, in which case I use the strips 10 and 11 to bind the yoke to the support 38. The stock is shown in dotted lines by S.

The operation of this part of my invention in the illustration shown is as follows: The band pulley C. receives the power and revolves the shaft F., which conveys the power to pinion 1, from thence to gear 2 and shaft G. and elliptic gear 3, from elliptic gear 3 to elliptic gear 4, and from gear 4 to the arm 5, which arm 5 engages with the gear on the yoke 6, thus giving a reciprocating movement to the yoke and saw. This reciprocating movement of the saw is comparatively slow as the saw moves into the stock, and comparatively rapid as it is withdrawn therefrom, the object being to withdraw the saw rapidly, thereby saving time.

Upon the shaft G. is a sprocket wheel 28, attached by a feather key in order to be moved along the shaft while it revolves with such shaft. The form of the feather key does not differ from those in ordinary use, and therefore I have not shown it in the drawings. The hub of the sprocket wheel 28 is connected by an arm 30 to the moving carriage 24. The carriage 24 rests upon the frame of the machine, upon which it is moved longitudinally. Rigidly attached to the carriage is the rack bar 25, having cogs engaging with cogs on gear wheel 21. The gear wheel 21 is rigid with shaft 20, as is also ratchet wheel 19. Upon the yoke 7 is a stud 12, which engages with the forked lever 13, as the saw is withdrawn from the block or stock S., and turns the lever 13 upon its fulcrum 14. At pivot 15 the rod 16 is connected to the lever 13. The opposite end of rod 16 is connected to arm 17, which arm carries a dog 18, engaging with ratchet wheel 19 on the shaft 20, revolving such shaft and moving the carriage with the stock S. forward as the saw is withdrawn, into position for the next cut of the returning saw. This lever is carried back by the forward movement of the saw, the dog slipping over the teeth on the ratchet, leaving the lever 13 in position to be again moved as the saw is retracted.

39. 39 are journal boxes upon the carriage, bearing a shaft 41. Attached to shaft 41 is a universal chuck, 31, rigidly connected to such shaft and provided with jaws 32, 32, for attaching the stock S. A sprocket wheel 40 is placed loosely upon the shaft 41, which sprocket wheel is connected by means of the chain belt 29 to the sprocket wheel 28 on shaft G. A friction clutch 26, is secured upon the shaft 41 so as to turn with it, but so as to have a sliding movement, in order to allow for engagement with and disengagement from the sprocket wheel 40, as may be required. The arm 30 engages with the hub of the sprocket wheel 28, moving said sprocket wheel 28 so as to keep it at all times in line with sprocket wheel 40. A lever 23 is used to engage and disengage friction clutch 26 and sprocket wheel 40.

The operation of the feeding mechanism is as follows: The movement of the yoke 7 in retracting the saw, brings stud 12 in contact with the pivoted lever 13, and through the connecting rod 16, arm 17, and dog 18, revolves ratchet wheel 19, shaft 20, cog wheel 21, moving forward the rack 25 and carriage 24 with the stock S., thus placing the stock S. in position for the saw as it is returned. The stock being revolved by the chain band 29, the forward movement of the saw returns the lever 13, rod 16, arm 17, and dog 18 in position to again move forward with the carriage and stock as the saw is retracted. A spring 27 is used merely to prevent the too easy rotation of the shaft 41, which rotates the stock. The arrangement of parts is such that the saw is gradually fed into the block or wood from the outside to the center of rotation thereof, for the purpose of completely severing a concavo-convex dish from such block or wood. The arrangement of parts is also such that the segmental saw is adapted to revolve and to oscillate from a point the same distance from the saw as the length of a radius of the segment, which will be understood by explaining that in order that the saw will enter the block without binding, the curve of the saw must be such that it forms the segment of a sphere having the center of the sphere the turning point, or rather the axis of the yoke 7, and the distance from the turning point, or axis of the yoke 7, to the path of the saw is the radius of the sphere or segment.

Upon the frame I place standards 33, 33, and to the upper ends of these standards I pivot arms 34, 34 by pivots 35, 35, upon which the arms swing freely. Attached to these swinging arms is the follower 36, which is designed to follow the periphery of the universal chuck 31, which, as shown in the drawings, is scalloped, but the form of the periphery may be varied. Upon one of the swinging arms is mounted a shaft 42, bearing a cutter K. and a pulley E., which pulley E. is operated by a belt connected with any suitable machinery. The cutter K. operates upon the periphery of the revolving stock S., being guided by the follower and cutting the periphery of the stock into the same form as the periphery of the chuck 31, which, in the form of my invention shown in the drawings, will make a scalloped edge to the dish. By extending the saw arbor from the concave face of the saw, and mounting the arbor on a yoke or frame for imparting a feed movement to the saw in a circular path it is possible to rapidly and practically sever the concavo-convex dishes from the face of a revolving block.

The dishes cut by my process may contain peripheries of any suitable form, the one illustrated having a scalloped periphery. The dish is not claimed in this application, but I design to make the same the subject of a separate application hereinafter to be filed.

I have shown what I deem to be the preferable means for carrying into practical use my invention, but it is evident that variations may be made without departing from the spirit of the same.

Having thus described my invention, what I claim to have invented, and desire to secure by Letters Patent, is—

1. In a dish machine, the combination of a segmental saw, a saw arbor extending from the concave face of the saw, a continuously revolving block-holder or chuck which revolves the block of wood, and means for gradually feeding the saw into the block from the outside to the center of rotation thereof to completely sever a concavo-convex dish therefrom, substantially as described.

2. The combination of a continuously revolving block holder or chuck, with a segmental saw, and means for gradually feeding the saw into the block from the outside to the center of rotation thereof to completely sever a concavo-convex dish therefrom, substantially as described.

3. The combination of a segmental saw, a continuously revolving block holder or chuck, suitable mechanism for revolving such block, and means for gradually feeding the saw into the block from the outside to the center of rotation thereof to completely sever a concavo-convex dish therefrom, substantially as described.

4. The combination of a segmental saw, adapted to revolve and to oscillate from a point the same distance from the saw as the length of a radius of the segment, a continuously revolving block holder or chuck, and means for gradually feeding the saw into the block from the outside to the center of rotation thereof to completely sever a concavo-convex dish therefrom, substantially as described.

5. The combination of a segmental saw mounted upon an arbor extending from the concave side of the saw and adapted to turn from the radial center of the segment, a continuously revolving block holder or chuck, and means for gradually feeding the saw into the block from the outside to the center of rotation thereof to completely sever a concavo-convex dish therefrom, substantially as described.

6. The combination of a segmental saw mounted upon an arbor, a continuously revolving block holder or chuck, suitable mechanism for feeding the block holder or chuck toward the saw, and means for gradually feeding the saw into the block from the outside to the center of rotation thereof to completely sever a concavo-convex dish therefrom, substantially as described.

7. The combination of a segmental saw mounted on an arbor, a revolving block holder or chuck, a revolving cutter in position to operate upon the periphery of the revolving block as the same is fed to the segmental saw, and means for gradually feeding the saw into the block from the outside to the center of rotation thereof to completely sever a concavo-convex dish therefrom, substantially as described.

8. A revolving segmental saw mounted on an arbor, said saw oscillating upon a radial center of the segment, a block holder or chuck continuously revolved by suitable mechanism, means for gradually feeding the saw into the block from the outside to the center of rotation thereof, and mechanism adapted to move the saw rapidly away from the block after a dish has been cut therefrom, substantially as described.

9. In a dish cutting machine, the combination of a segmental saw, a holder or chuck supporting the block, a suitable pattern, a follower connected to a movable support, a revolving cutter connected with the follower, said follower adapted to follow the periphery of the pattern and the revolving cutter adapted to fashion the periphery of the revolving block into the form of the periphery of the pattern as the same is fed to the segmental saw, and means for gradually feeding the saw into the block from the outside to the center of rotation thereof to completely sever a concavo-convex dish therefrom, substantially as described.

10. The combination of the segmental saw mounted on a revolving arbor, a yoke or support for the arbor, turning on the radial center of the segment, suitable mechanism for turning the support, a revolving block holder, suitable mechanism, for continuously revolving the block holder, and means for gradually feeding the saw into the block from the outside to the center of rotation thereof to completely sever a concavo-convex dish therefrom, substantially as described.

11. The combination of the segmental saw mounted on a revolving arbor, a yoke or support for the saw arbor, turning on the radial center of the segment, a continuously revolving block holder, suitable mechanism for moving the block holder intermittently toward the saw, and means for gradually feeding the saw into the block from the outside to the center of rotation thereof to completely sever a concavo-convex dish therefrom, substantially as described.

12. The combination of the segmental saw mounted on an arbor, a support for the saw arbor turning from the radial center of the segment, an oscillating arm engaging with the support of the saw arbor, elliptical gearing connected with the oscillating arm for giving a slow feed motion to the saw, and a rapid retrograde movement, and suitable mechanism for operating the elliptical gear, substantially as described.

13. The combination of the segmental saw and its arbor, the yoke supporting the same, the arm engaging with the saw arbor support, elliptical gear connected with the arm for giving the reciprocating movement to the saw, the revolving block, a movable carriage supporting the block, mechanism for revolving the block, feeding mechanism for moving the block toward the saw, and a friction clutch adapted to engage and disengage the mechanism from the shaft which revolves the block, substantially as described.

In witness whereof I have hereunto set my hand and seal in the presence of two witnesses.

DAVID H. BRENNER. [L. S.]

Witnesses:
EDWARD TAGGART,
HUGH E. WILSON.